(12) United States Patent
Massarenti

(10) Patent No.: US 7,404,186 B2
(45) Date of Patent: Jul. 22, 2008

(54) SIGNATURE SERIALIZATION

(75) Inventor: Davide Massarenti, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 730 days.

(21) Appl. No.: 10/448,171

(22) Filed: May 28, 2003

(65) Prior Publication Data

US 2004/0244012 A1 Dec. 2, 2004

(51) Int. Cl.
*G06F 3/00* (2006.01)
*G06F 15/16* (2006.01)

(52) U.S. Cl. ..................... 719/311; 709/231
(58) Field of Classification Search ............... 707/203; 709/231–237; 715/737, 738, 740, 749; 717/170; 718/106; 719/311, 328, 330, 331, 332
See application file for complete search history.

(56) References Cited

U.S. PATENT DOCUMENTS

| | | | | | |
|---|---|---|---|---|---|
| 5,944,781 | A * | 8/1999 | Murray | ...................... | 709/202 |
| 6,154,747 | A * | 11/2000 | Hunt | .......................... | 707/100 |
| 6,272,521 | B1 * | 8/2001 | Jablonski et al. | ............. | 709/200 |
| 6,292,933 | B1 * | 9/2001 | Bahrs et al. | ................... | 717/707 |
| 6,301,585 | B1 * | 10/2001 | Milne | ...................... | 707/103 R |
| 6,438,559 | B1 * | 8/2002 | White et al. | ............ | 707/103 R |
| 6,477,701 | B1 * | 11/2002 | Heistermann et al. | ........ | 717/108 |
| 6,931,409 | B2 * | 8/2005 | Redpath | ...................... | 707/100 |
| 6,941,561 | B1 * | 9/2005 | Kasichainula et al. | ........ | 719/330 |
| 7,007,269 | B2 * | 2/2006 | Sluiman et al. | .............. | 717/130 |
| 7,150,004 | B2 * | 12/2006 | Russell et al. | ................ | 717/118 |
| 2002/0087717 | A1 * | 7/2002 | Artzi et al. | ................... | 709/236 |
| 2002/0124118 | A1 * | 9/2002 | Colley et al. | ................ | 709/315 |
| 2004/0055005 | A1 * | 3/2004 | Creswell et al. | ............. | 719/315 |
| 2004/0064825 | A1 * | 4/2004 | Lim et al. | .................... | 719/319 |
| 2004/0073913 | A1 * | 4/2004 | Fairweather | ................. | 719/328 |

* cited by examiner

*Primary Examiner*—Meng-Ai An
*Assistant Examiner*—Charles E Anya
(74) *Attorney, Agent, or Firm*—Lee & Hayes, PLLC

(57) ABSTRACT

One or more electronically-accessible media including electronically-executable instructions that direct an apparatus to perform actions including: inserting a type signature tag into a serialized binary blob to serialize an object, the type signature tag including a type signature based on an object type of the object; and transmitting the serialized binary blob. An arrangement including: a signature table having multiple entries, each respective entry of the multiple entries associating a respective object type with a respective type signature, each respective type signature created responsive to a structural representation of the respective object type associated therewith. An apparatus including: one or more media having electronically-executable instructions; and one or more processors capable of executing the electronically-executable instructions to perform actions including: receiving a serialized binary blob; and deserializing an object by extracting a type signature from the serialized binary blob, the type signature derivable from an object type of the object.

41 Claims, 7 Drawing Sheets

SIGNATURE SERIALIZATION

TECHNICAL FIELD

This disclosure relates in general to signature serialization and in particular, by way of example but not limitation, to serializing information for objects using signature tags that are derivable from a type system on which the objects are based. Other implementations relate, for example, to forward version compatibility, to creating and using serialization hints, etc. as described further below.

BACKGROUND

The traditional functional-oriented approach to programming has largely been superseded by the object-oriented programming approach. With functional-oriented programming, code is organized around actions and written based primarily on logic. With object-oriented programming, code is organized around "objects" and written responsive primarily to the underlying data.

Object-oriented programming provides many conceptual advances and code-related benefits such as reusability, adaptability, modularity, and so forth. These benefits arise, at least partly, from the fundamental tenets of object-oriented programming and the principles that flow therefrom. For example, object-oriented programming usually adheres to encapsulation, inheritance, and polymorphism.

Particularly because of polymorphism, object-oriented programming typically results in complex interrelationships between and among different objects. These interrelationships are established and/or utilized when the object-oriented programming is being executed. In a runtime environment, predecessor and successor linkages from each object to one or more other objects are maintained, manipulated, utilized, and so forth.

Such complex interrelationships of objects as represented partially by predecessor and successor linkages form non-linear relationships that are referred to as graphs of objects. Although utilizing these graphs of objects facilitates adaptability, modularity, and other organizational and operational flexibilities, they also tend to increase the requisite memory and processing bandwidth during runtime.

Furthermore, when a multi-dimensional graph of objects is to be transmitted from an originating entity to a destination entity, serialization is employed. At the originating entity, the graph of objects is serialized and then transmitted in serialized form to the destination entity. At the destination entity, the serialized form is received and then deserialized into another graph of objects with the accompanying non-linear relationships. Unfortunately, communicating the serialized form from originating entity to destination entity is bandwidth intensive.

Accordingly, there is a need for a serialization of objects paradigm that reduces bandwidth demands.

SUMMARY

Signature-related serialization involves one or more of type signatures, serialization hints, prefixes corresponding to fields of object types, signature tables, optional fields for forward-version compatibility, and so forth as described herein.

In an exemplary media implementation, one or more electronically-accessible media includes electronically-executable instructions that, when executed, direct an electronic apparatus to perform actions including: inserting a type signature tag into a serialized binary blob to serialize an object, the type signature tag including a type signature based on an object type of the object; and transmitting the serialized binary blob.

In an exemplary arrangement implementation, an arrangement includes: a signature table having multiple entries, each respective entry of the multiple entries associating a respective object type with a respective type signature, each respective type signature created responsive to a structural representation of the respective object type associated therewith.

In an exemplary apparatus implementation, an apparatus includes: one or more media, the one or more media including electronically-executable instructions; and one or more processors, the one or more processors capable of executing the electronically-executable instructions to perform actions including: receiving a serialized binary blob; and deserializing an object by extracting a type signature from the serialized binary blob, the type signature derivable from an object type of the object.

Other method, procedure, system, protocol, schema, approach, apparatus, paradigm, media, process, arrangement, etc. implementations are described herein.

BRIEF DESCRIPTION OF THE DRAWINGS

The same numbers are used throughout the drawings to reference like and/or corresponding aspects, features, and components.

DETAILED DESCRIPTION

Exemplary Serialization Environment

Figure 1:
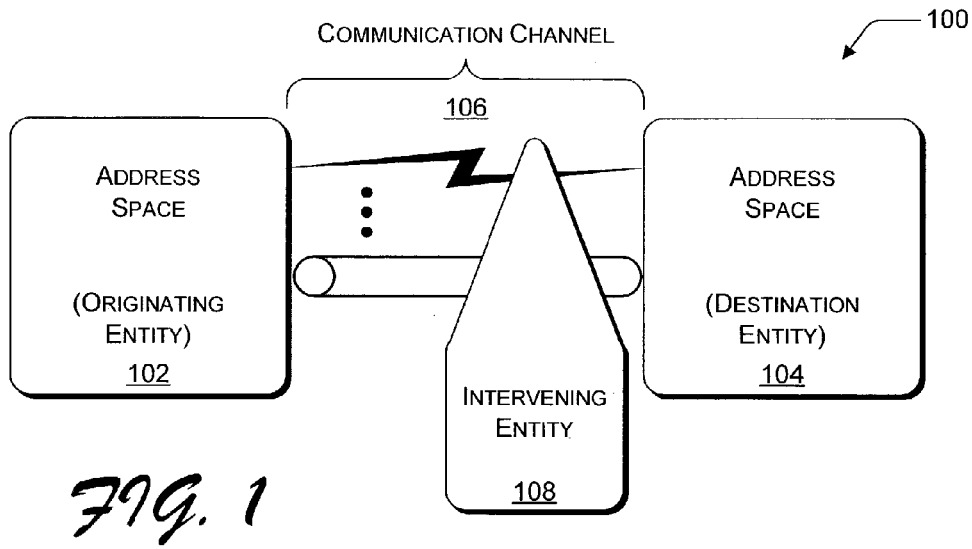
FIG. 1 illustrates an exemplary environment in which one or more serialization-related implementations may be practiced.

FIG. 1 illustrates an exemplary environment 100 in which one or more serialization-related implementations may be practiced. Environment 100 includes a first address space 102 and a second address space 104. First address space 102 and second address space 104 are each coupled to a communication channel 106. Information may be transmitted from first address space 102 and received at second address space 104, and vice versa, via communication channel 106.

In a described implementation, first address space 102 comprises an originating entity 102 and second address space 104 comprises a destination entity 104. Originating entity 102 is capable of transmitting serialized object information over communication channel 106, and destination entity 104 is capable of receiving the serialized object information via communication channel 106, and vice versa.

Communication channel 106 comprises one or more communication channels, such as pipe between processes, an inter- or intra-chip bus, a wireline connection, a wireless connection, some combination thereof, and so forth.

Communication channel 106 may be adapted to use any underlying transport protocol. Communication channel 106 may also include one or more intervening entities 108 that facilitate transmission of serialized object information from originating entity 102 to destination entity 104.

Entities 102, 104, and 108 may be realized in any one or more of many possible implementations, including as one or more media and/or one or more electronic devices. Furthermore, each of entities 102, 104, and 108 may comprise a thread, a process, a module or routine, a program, a database, a server or client computer, a network, a laptop/desktop/palmtop/tablet computer, a printer or multifunction device, a game console or other entertainment device, a storage medium, a personal digital assistant (PDA), a mobile phone or other wireless mobile station, a watch with communication capabilities, and so forth.

It should be understood, however, that alternative implementations for originating entity 102 and/or destination entity 104 may be used for signature serialization as described herein. Additionally, an exemplary general electronic device that may be used to implement one or more aspects of signature serialization is described further below with reference to FIG. 10. Exemplary implementations for originating entities 102 and destination entities 104 that utilize communication channel(s) 106 are also described further below.

Exemplary Signature-Tagging Serialization Paradigm

Figure 2:
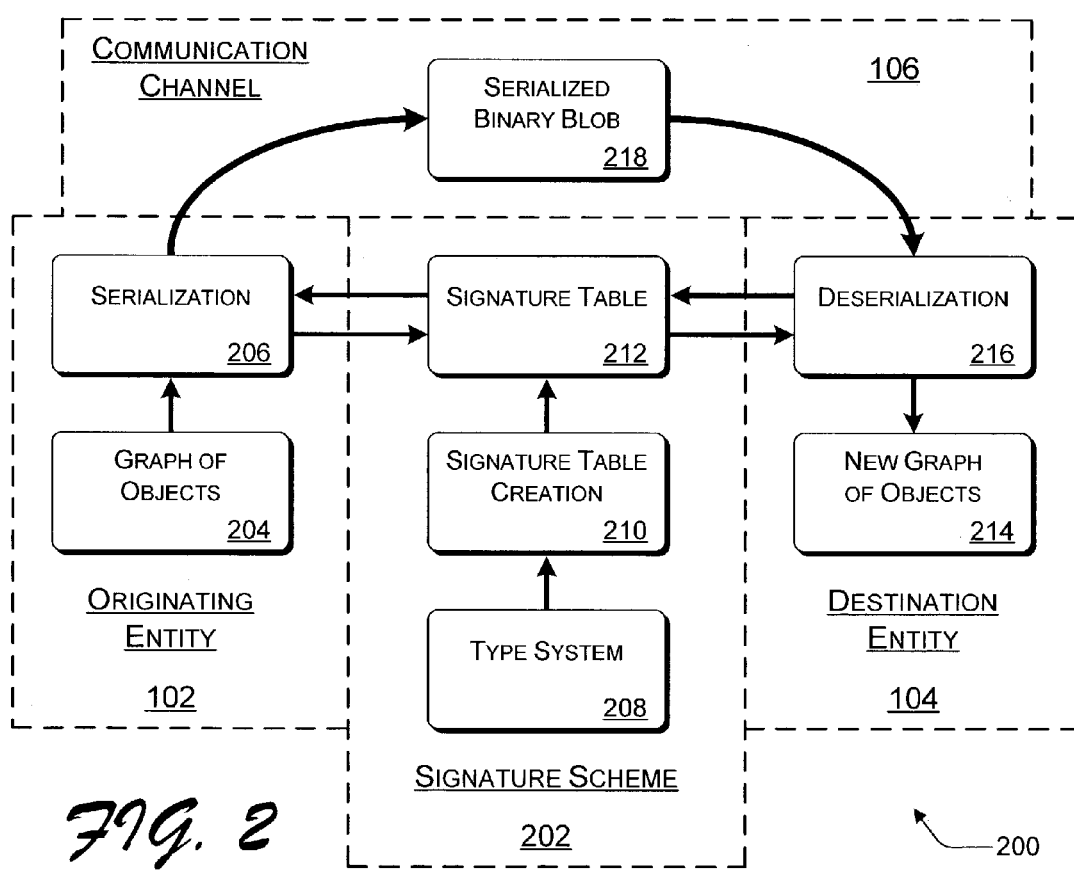
FIG. 2 illustrates an exemplary signature-tagging serialization paradigm.

FIG. 2 illustrates an exemplary signature-tagging serialization paradigm 200. Signature-tagging serialization paradigm 200 includes originating entity 102, destination entity 104, communication channel 106, and a signature scheme 202. As illustrated, originating entity 102 includes a graph of objects 204 and serialization (procedure block) 206. Destination entity 104 includes a new graph of objects 214 and deserialization (procedure block) 216. Communication channel 106 includes a serialized binary blob 218 that is accepted at communication channel 106 from originating entity 102 and that is provided from communication channel 106 to destination entity 104.

Signature scheme 202 includes a type system 208, a signature table creation (procedure block) 210, and a signature table 212. Signature table 212 is accessed by serialization 206 and deserialization 216 as indicated by the double arrows therebetween. Signature scheme 202 may be located at and/or may be effectuated at originating entity 102, destination entity 104, a third entity (not specifically illustrated in FIG. 2), some combination or permutation thereof, and so forth. For example, signature table 212 may be created with signature scheme 202 at a third entity such that signature table 212 is provided to (or access thereof is provided to) originating entity 102 and destination entity 104 thereafter. However, in a described implementation, signature scheme 202 (and creation of signature table 212) is effectuated separately by both originating entity 102 and destination entity 104 from a given type system 208, which is stored or otherwise accessible thereat.

Type system 208 presents, enumerates, or otherwise describes defined types (e.g., classes) for objects that may possibly be instantiated or otherwise used in a given environment or subset thereof. These object types may be defined in any general data structure format, including a listing, a table, metadata, some combination thereof, and so forth. A general example of a type and a sub-type are:

```
Class Node
{
    Node Predecessor;
    Node[] Successor;
    Element.Type[] Values;
}
Class Subnode:Node
{
    Element Type Value2;
}
```

Type system 208 thus contains knowledge of the structural representation of available object types. The structural representation of an exemplary object type is described further below with reference to FIG. 3.

In general, a serialization process can account for or otherwise address the full name plus the version of a type for each object involved in the serialization. Specifically, a serializer can inject the full name plus the version of each type into a serialized bit stream for each object involved in a serialization. Thus, a serialized bit stream can contain a rich set of extra information, like the type name of all the objects present in a graph, their version, and so forth. Although explicitly providing these enables a certain level of flexibility, a drawback is the resulting large overhead in terms of binary blob size. Such a large binary blob demands a high bandwidth in relation to memory occupation, communication channel usage, and energy requirements. However, the size of the binary blob can be reduced using signature scheme 202 along with other aspects as described herein and in conjunction with originating entity 102 and destination entity 104.

Generally, signature scheme 202 takes type system 208 and produces signature table 212 using signature table creation 210. Signature table 212 associates each object type of type system 208 with a type signature. Signature table creation 210 consults type system 208 in order to populate signature table 212 with the associations. Hence, the type signature can identify and/or indicate the associated object type, and vice versa, with reference to signature table 212.

Specifically for a described implementation, a particular type signature is created responsive to/based on one or more characteristics of the particular object type to which the particular type signature is associated. These characteristics may be or may be related to, for example, type name of the particular object type, one or more fields of the particular object type, predecessor or successor object types of the particular object type, some combination thereof, and so forth.

Alternatively, each type signature may be a code that provides a one-to-one correspondence between type signatures and object types. For example, each type signature may be a randomly assigned code. Whether the type signature is derived from the associated object type or otherwise created (e.g., coded), if the resulting type signature is smaller/shorter than the type name, the version, etc. of a given object type, then the given object type of an object can be indicated with lower bandwidth resources. Consuming lower bandwidth resources enables information to be transmitted more efficiently.

When signature scheme 202 is effectuated at both originating entity 102 and destination entity 104, type system 208 is effectively a way to share information on the two sides. A reduced, if not a minimal, amount of data that is usable to unambiguously resolve an object type of a given object is transmitted from a first address space to a second address space. This reduced amount of data may then be used in conjunction with a signature table 212, which is created from a type system 208, to resolve the object type of a received object during deserialization.

In a hashing implementation that is described further below, the name of a particular object type, the particular object type's place in the type system hierarchy, and the number and kinds or types of member fields of the particular object type are used to create/generate a 32-bit value. This 32-bit value is stored in association with the particular object type in signature table 212. The associated 32-bit value is used to tag instances of the particular object type during a serialization procedure.

Thus, after being created from type system 208 by signature table creation 210, signature table 212 associates individual object types with individual type signatures. An exemplary data structure for a signature table 212 is described further below with reference to FIG. 4.

In operation, originating entity 102 has access to and/or is manipulating graph of objects 204. An exemplary graph of objects 204 is described further below with reference to FIG. 5. Graph of objects 204 is serialized by serialization 206 with reference to signature table 212. Specifically, for each object in graph of objects 204, the object type thereof is used to access signature table 212 and ascertain an associated type signature therefrom.

When serialization 206 constructs serialized binary blob 218 from graph of objects 204 and signature table 212, serialization 206 inserts the associated type signature into serialized binary blob 218 to tag/indicate the type of each object being serialized. An exemplary serialized binary blob 218 having a type signature tag is described further below with reference to FIG. 6. After serializing the objects of graph of objects 204 into serialized binary blob 218, originating entity 102 transmits serialized binary blob 218 over communication channel 106.

Destination entity 104 receives serialized binary blob 218 via communication channel 106. Deserialization 216 extracts the associated type signature from serialized binary blob 218. The associated type signature indicates a type of an object to which the associated type signature is tagged. Deserialization 216 uses the associated type signature to access signature table 212 and ascertain the object type associated therewith. If desired, type system 208 can be consulted using the ascertained object type to determine the structural representation of the object type of the object being deserialized.

Deserialization 216 uses the expected structural representation of the object being deserialized to interpret the information of serialized binary blob 218. As additional objects are deserialized, deserialization 216 builds new graph of objects 214 that replicates graph of objects 204. This replication includes the linkages interconnecting the objects of graph of objects 204. Replication or new may refer to a move operation or a copy operation for the communication of graph of objects 204 from originating entity 102 to destination entity 104 as new graph of objects 214. In other words, graph of objects 204 may or may not remain at originating entity 102 after transmission of serialized binary blob 218.

Exemplary Serialization Components for the Exemplary Signature-Tagging Serialization Paradigm Exemplary signature-tagging serialization paradigm 200 (of FIG. 2) includes multiple components, each of which may be implemented using hardware, software, firmware, some combination thereof, and so forth. This section addresses graph of objects 204, signature table 212, serialized binary blob 218, and an exemplary structural representation for an object type of type system 208. Exemplary components for serialization 206, signature table creation 210, and deserialization 216 are described further below with reference to a hashing implementation.

Exemplary Object Type as Reflection of a Type System

Figure 3:
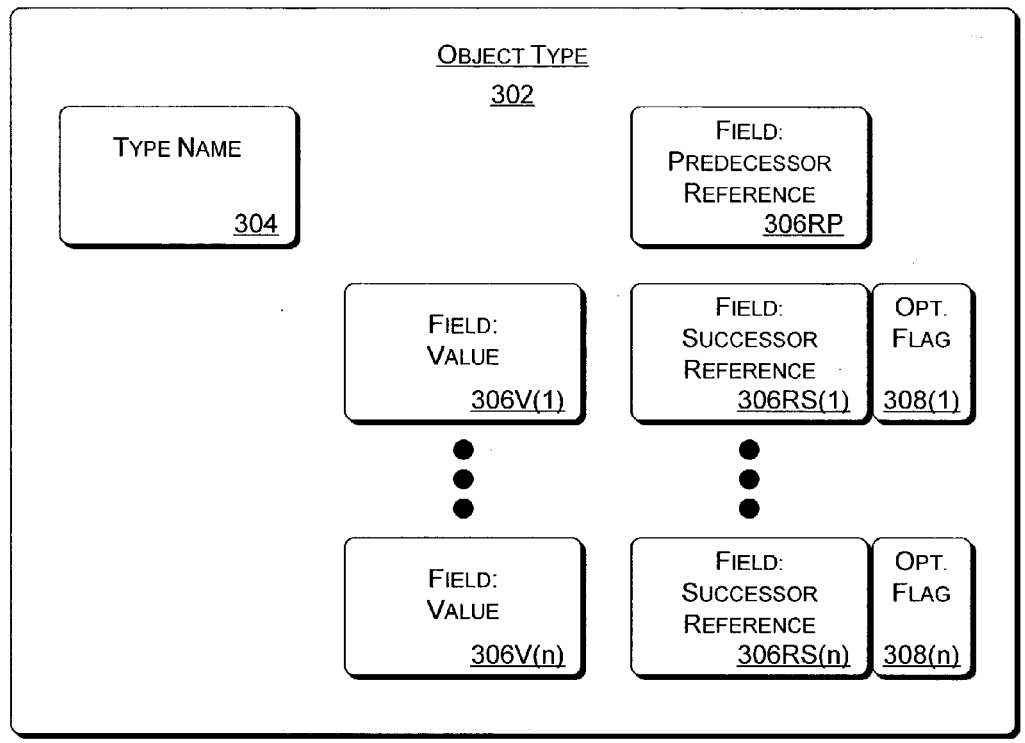
FIG. 3 is an exemplary object type that illustrates characteristics of an object type system as shown in FIG. 2.

FIG. 3 is an exemplary object type 302 that illustrates characteristics of an object type system 208 as shown in FIG. 2. Each object type 302 includes a type name 304 and one or more fields 306. These fields may include one or more value fields 306V(1) . . . 306V(n) and one or more reference fields 306R. Of the reference fields 306R, there is typically one predecessor reference field 306RP, and optionally one or more successor reference fields 306RS(1) . . . 306RS(n). However, other field selections may alternatively be employed, depending on the object-oriented programming standards being followed.

Type system 208 therefore contains knowledge of the structural representation of available object types 302. Consequently, during deserialization, a received type signature that has been converted to an object type using signature table 212 may be used to consult type system 208. Type system 208 provides the structural representation of the object type in accordance with exemplary object type 302.

Exemplary Signature Table Data Structure

Figure 4:
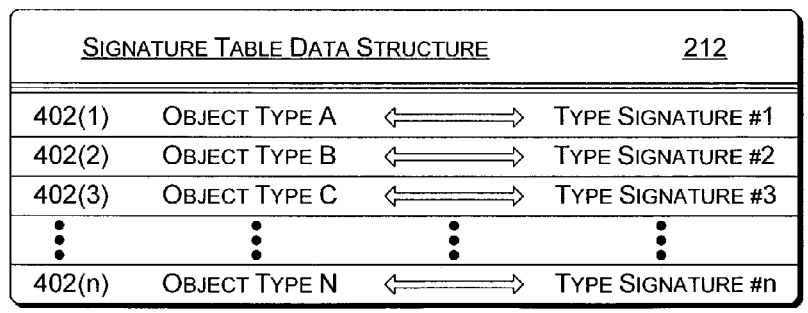
FIG. 4 is an exemplary data structure for a signature table as shown in FIG. 2.

FIG. 4 is an exemplary data structure for a signature table 212 as shown in FIG. 2. A data structure implementation of signature table 212 includes multiple entries 402(1), 402(2), 402(3) . . . 402(n). Each entry 402 associates/links an object type of type system 208 with a type signature. As described herein, each respective type signature of a given respective entry 402 may be created based on/responsive to the respective object type of the given respective entry 402.

As illustrated, entry 402(1) associates object type A with type signature #1.

Entry 402(2) associates object type B with type signature #2. Entry 402(3) associates object type C with type signature #3. And entry 402(n) associates object type N with type signature #n. In a described implementation, there is one entry 402 for each object type 302 of type system 208. For example, there may be dozens, hundreds, thousands, or even more object types 302 in a given type system 208.

Exemplary Graph of Objects

Figure 5:
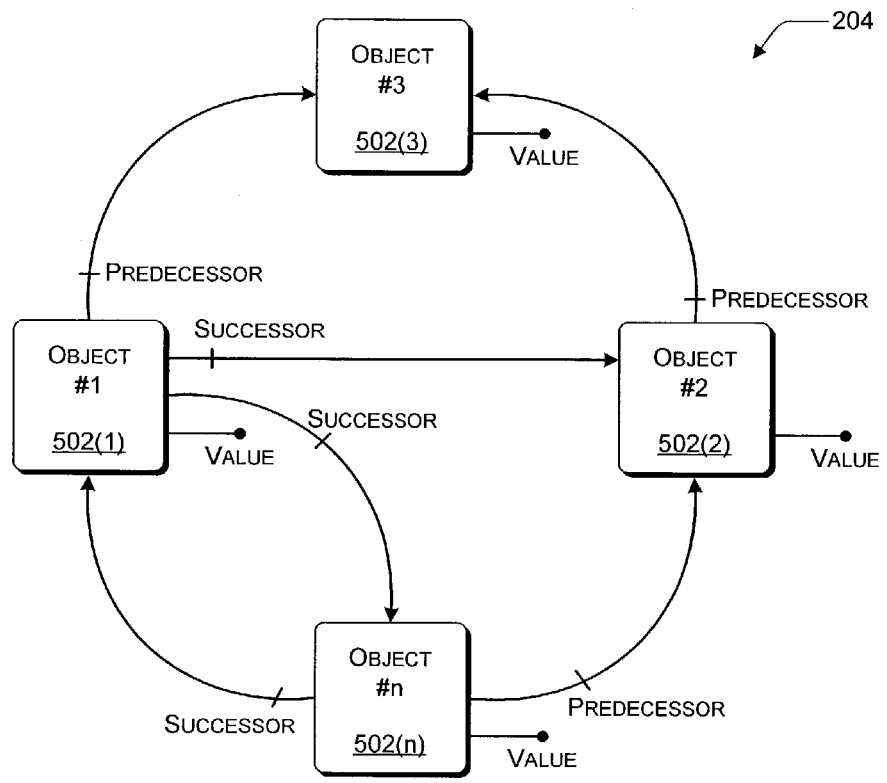
FIG. 5 is an exemplary graph of objects as shown in FIG. 2.

FIG. 5 is an exemplary graph of objects 204 as shown in FIG. 2. Graph of objects 204 includes "n" nodes or objects 502, where n=1, 2, 3 . . . up to the number of objects currently instantiated and/or being manipulated. Four objects are illustrated (n=4). Specifically, object #1 502(1), object #2 502(2), object #3 502(3), and object #n 502(n) are included as part of graph of objects 204.

Graph of objects 204 also includes items representing various fields, both value and reference fields, of objects 502(1 . . . n). A value field is represented for each of the four objects #I-n 502(1 . . . n). Although only one value field is included for each object 502 in FIG. 5, each object 502 may in practice have multiple such value fields.

The reference fields represent linkages between and among different objects 502, and they include both predecessor and successor references. Each of objects #1, #2, #n 502(1, 2, n) includes a predecessor reference field as represented by the predecessor reference arrows. Specifically, object #1 502(1) and object #2 502(2) each reference object #3 502(3) as their predecessor object. Object #n 502(n) references object #2 502(2) as its predecessor object.

Although not required, objects 502 typically include one predecessor reference. Object #3 502(3), on the other hand, does not include a predecessor reference. As such, object #3 502(3) may be considered the root object or node of graph of objects 204. More generally, however, a root of a given graph of objects may be considered to be the object or node that is selected to be serialized first.

Objects 502 typically include zero, one, or more successor references as represented by the successor reference arrows. Object #2 502(2) and object #3 502(3) do not include a successor reference in graph of objects 204. Object #n 502(n) includes one successor reference: a successor reference to object #1 502(1). Object #1 502(1) includes two successor references: a successor reference to object #2 502(2) and a successor reference to object #n 502(n).

Signature serialization as described herein enables a graph of objects 204, such as the exemplary graph illustrated in FIG. 5, at an originating entity 102 (of FIGS. 1 and 2) to be replicated as a new graph of objects 214 at a destination entity 104. This replication can include the value and reference fields as graphically illustrated in FIG. 5. It should be understood that a graph of objects 204 can, and usually does, include many more than four objects and that the reference linkages are frequently more complicated than those illustrated.

Exemplary Serialized Binary Blob

Figure 6:
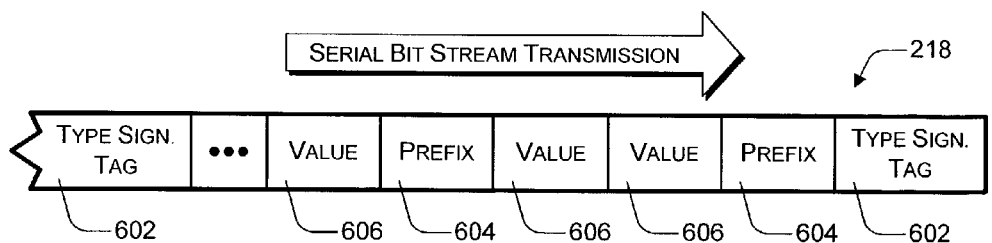
FIG. 6 is an exemplary serialized binary blob as shown in FIG. 2.

FIG. 6 is an exemplary serialized binary blob 218 as shown in FIG. 2. Serialized binary blob 218 may be constructed using any format, at any bit width or bit length, and so forth. Also, serialized binary blob 218 may be transmitted and received using any underlying transport protocol(s) or medium (media).

As illustrated, serialized binary blob 218 includes multiple type signature tags 602, multiple prefixes 604, and multiple values 606. Each given object 502 (of FIG. 5) that is serialized has a corresponding type signature tag 602, which includes the type signature associated with the given object 502. During construction of serialized binary blob 218, serialization 206 inserts type signature tag 602 as a header into serialized binary blob 218.

Prefixes 604 indicate particular fields 306 of the given object 502 and may comprise a predetermined bit length or bit lengths of any number of bits. Prefixes 604 are described generally further below with reference to FIGS. 7-9 and are described specifically further below in the context of hashing implementations. Each prefix 604 is followed by a value 606, which includes the current value in the given object 502 that corresponds to the field 306 indicated by the preceding prefix 604.

As illustrated in FIG. 6 and described further below, some values 606 do not follow a prefix 604. For example, if a field 306V of the given object 502 is a value type that cannot be sub-classed, then the information in a designated position of serialized binary blob 218 is known, or at least expected. Because deserialization 216 can properly interpret the information value, no field indicator prefix 604 need be provided for atomic types and other non-sub-classable types.

Exemplary Signature Scheme

Figure 7:
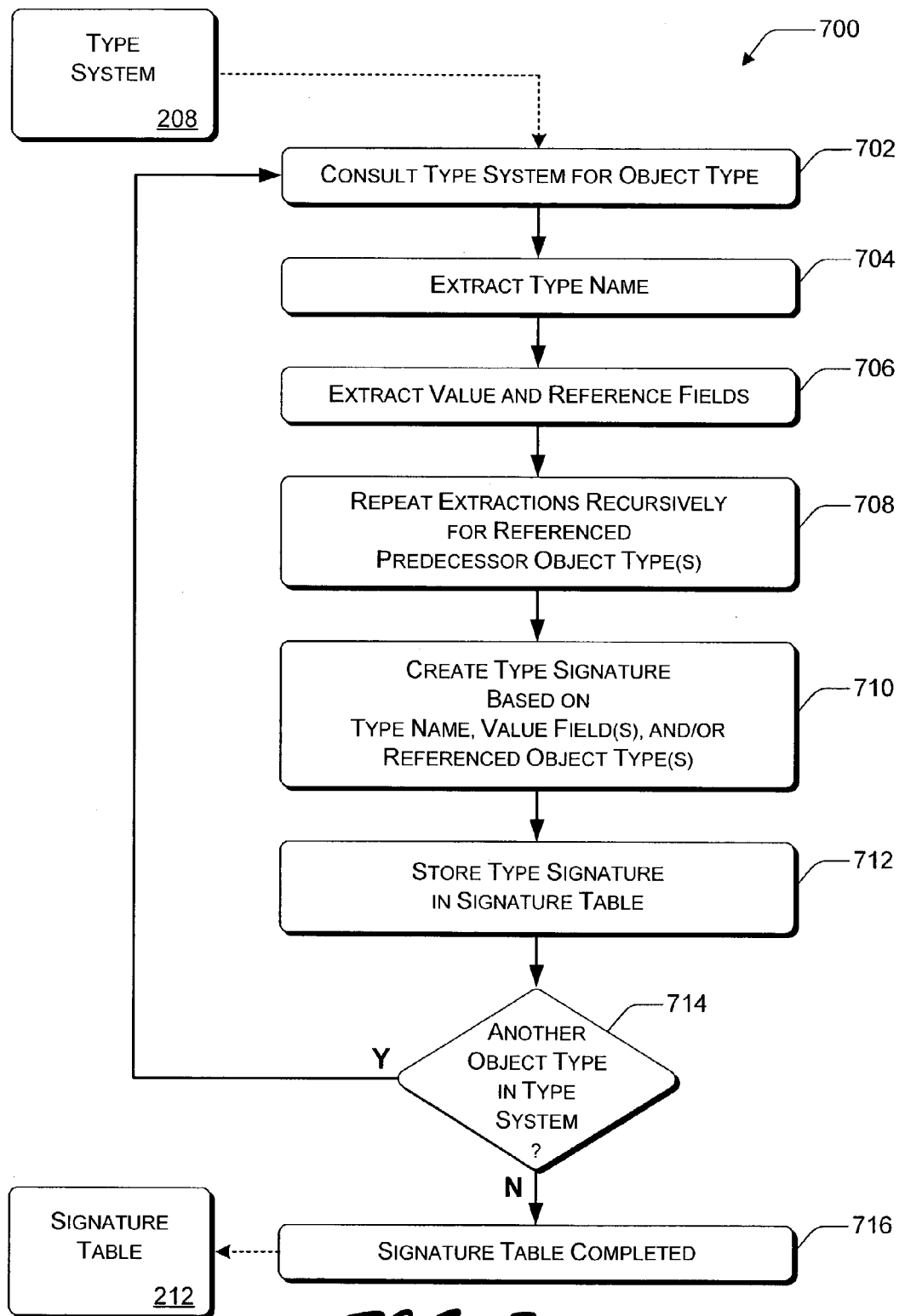
FIG. 7 is a flow diagram that illustrates an exemplary approach for implementing a signature scheme as shown in FIG. 2.

FIG. 7 is a flow diagram 700 that illustrates an exemplary approach for implementing a signature scheme 202 as shown in FIG. 2. Flow diagram 700 includes eight (8) blocks 702-716 that relate to at least one action each.

At block 702, a type system is consulted to acquire an object type. For example, a type system 208 may be consulted to acquire an object type 302. At block 704, a type name for the acquired object type is extracted. For example, a type name 304 may be extracted from object type 302.

At block 706, value and reference fields are extracted for the acquired object type. For example, value field(s) 306V and reference field(s) 306R may be extracted from object type 302. At block 708, extractions (e.g., for type name and/or fields) are repeated recursively for referenced predecessor object type(s). For example, for a predecessor reference field 306RP that references another object type 302', the type name 304' and/or fields 306' are extracted for that predecessor object type 302' in a recursive manner, which therefore continues for parent(s) of that predecessor object type 302' (if any).

At block 710, a type signature to be associated with the acquired object type is created based on the extracted type name, the extracted value field(s), and/or the referenced object type(s) (e.g., as represented by their extracted type name(s) and/or field(s)). For example, type name 304, value field(s) 306V, and/or referenced object types 302' (e.g., as represented by type name(s) 304' and/or value field(s) 306V' therefor) may be used to create a type signature to be associated with object type 302.

Such a type signature may be created using any one or more techniques that accept as input some aspect or aspects of one or more of type name 304, value field(s) 306V, and/or referenced object types 302' and produce as output a parameter usable as the type signature. Although not a determining factor, the more likely the technique is to automatically produce a different parameter for each object type, the easier the technique is to implement without manual oversight. An exemplary hashing technique implementation is described further below.

At block 712, the created type signature is stored in a signature table. For example, a type signature created from object type 302 may be stored in an entry 402 that corresponds to object type 302. The type signature may be stored in entry 402 of a signature table 212 in association with object type 302.

At block 714, it is determined whether an object type in the type system has yet to be analyzed for type signature creation. For example, it is determined whether there is another object type 302' of type system 208 for which an entry 402 therefor has yet to be populated with an associated type signature. If so, flow continues at block 702 to consult the type system and acquire the next object type.

If, on the other hand, it is determined at block 714 that there are no other object types of the type system yet to be analyzed, flow continues at block 716. At block 716, it may be confirmed that the signature table is completed and that each object type of the type system has an entry therein with a type signature stored in association therewith. For example, if object types 302 of type system 208 each have an entry 402 that is populated with an associated type signature in signature table 212, then signature table 212 may be considered complete under the current version of type system 208.

Exemplary Signature Serialization for an Originating Entity

Figure 8:
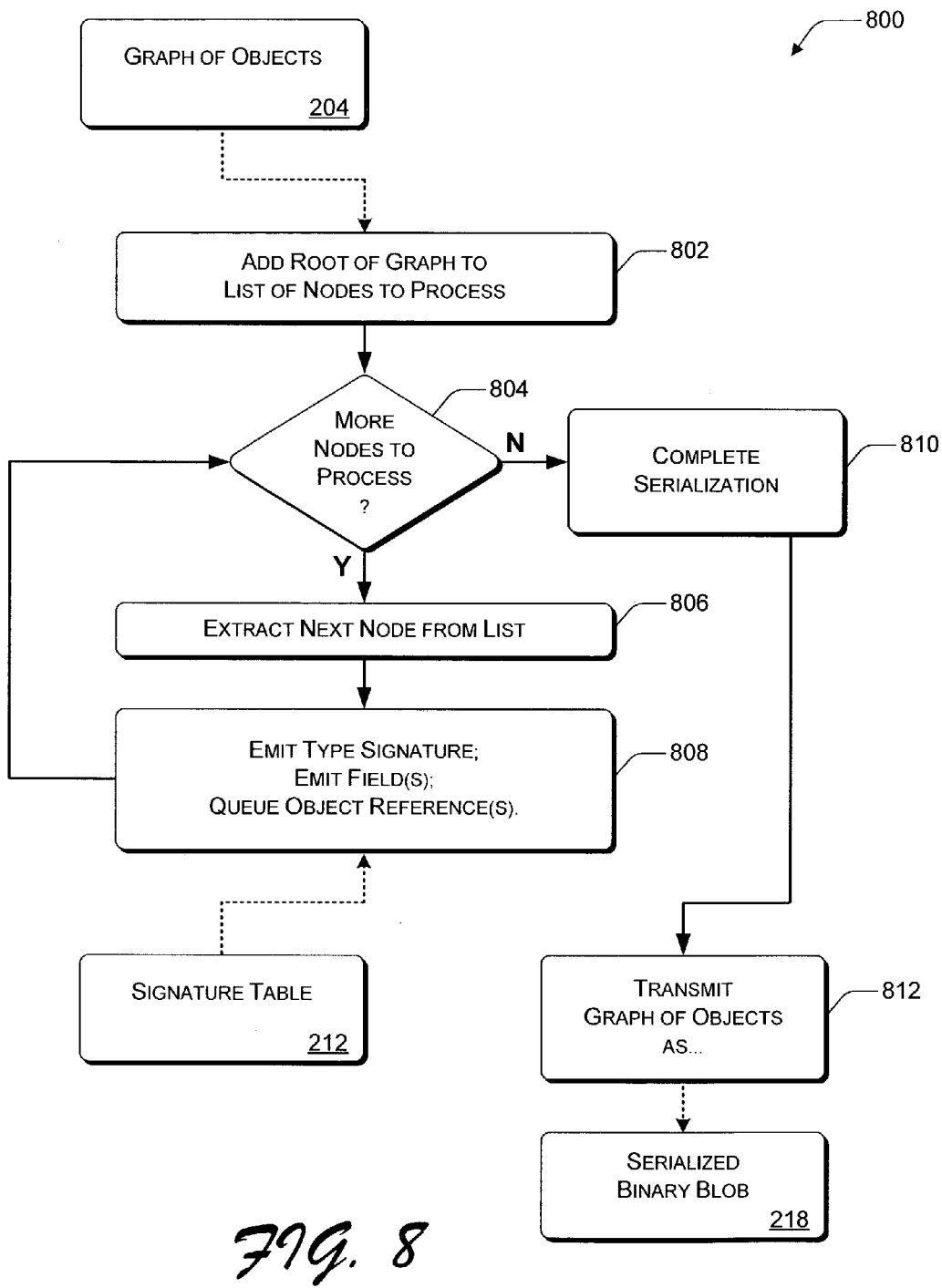
FIG. 8 is a flow diagram that illustrates an exemplary approach for signature serialization for an originating entity as shown in FIG. 2.

FIG. 8 is a flow diagram 800 that illustrates an exemplary approach for signature serialization for an originating entity 102 as shown in FIG. 2. Flow diagram 800 includes six (6) blocks 802-812 that relate to at least one action each.

At block 802, a root of a graph to be serialized is added to a list of nodes to be processed. For example, a graph of objects 204 may be accepted for processing, and a node for an object 502 that has no predecessor references (e.g., object #3 502(3)) may be selected as the root node and added to a list of objects for serialization processing. Such a list of objects for serialization processing may be formed from objects 502 in graph of objects 204. It should be noted that a root node may be more generally considered as any node at which serialization processing commences.

At block 804, it is determined whether there are more nodes in the list to process. For example, it may be determined whether there are more objects 502 of graph of objects 204 that have yet to be serialized. If so, flow continues at block 806 in which the next node from the list of nodes to be processed is extracted. For example, a next object 502 may be extracted from the list of objects.

At block 808 for the extracted node, a type signature is emitted; fields are emitted; and object references are queued. For example, an object type 302 of the extracted next object 502 may be used to access signature table 212. At an entry 402 of signature table 212 for the object type 302, an associated type signature may be ascertained. This type signature may be emitted into a serialized binary blob 218 as a type signature tag 602. Field(s) 306 of the extracted next object 502 may likewise be emitted, with a prefix 604 indicator as appropriate. Exemplary prefixes and the application thereof are described further below in relation to an exemplary hashing implementation. Also, the referenced objects 502' may be added to the list of nodes to be serialized.

If, on the other hand, it is determined at block 804 that there are no more nodes to process, flow continues at block 810 in which the serialization procedure may be considered to be complete. For example, if objects 502 of graph of objects 204 have been serialized, serialization thereof may be considered to be complete. At block 812, the graph of objects may be transmitted as a serialized binary blob/serialized bit stream. For example, originating entity 102 may transmit graph of objects 204 as serialized binary blob 218 over a communication channel 106.

Exemplary Signature Deserialization for a Destination Entity

Figure 9:
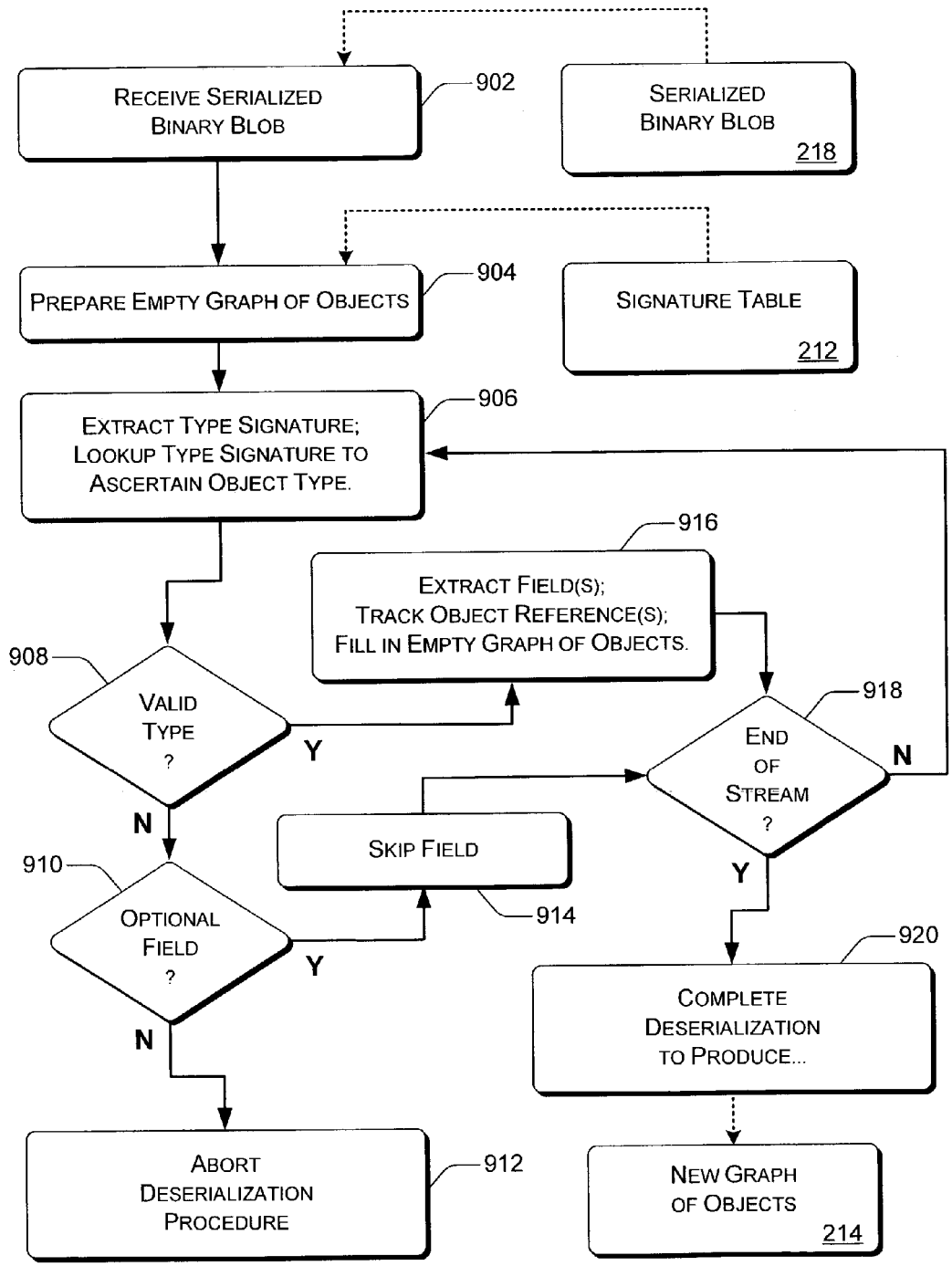
FIG. 9 is a flow diagram that illustrates an exemplary approach for signature deserialization for a destination entity as shown in FIG. 2.

FIG. 9 is a flow diagram 900 that illustrates an exemplary approach for signature deserialization for a destination entity 104 as shown in FIG. 2. Flow diagram 900 includes ten (10) blocks 902-920 that relate to at least one action each.

At block 902, a serialized binary blob is received. For example, a serialized binary blob 218 may be received at destination entity 104 via a communication channel 106. At block 904, an empty graph of objects is prepared. For example, a graph of objects to be filled in to produce/build a new graph of objects 214 may be prepared as a framework and/or as a matrix of placeholders.

At block 906, a type signature is extracted from the received serialized binary blob; and the type signature is looked up to ascertain an associated object type from a signature table. For example, a type signature of a type signature tag 602 may be extracted from serialized binary blob 218 and used to access signature table 212 at an entry 402 therefor in order to ascertain an associated object type 302.

At block 908, it is determined whether the object type as represented by the type signature constitutes a valid type. For example, if the type signature of type signature tag 602 is located in signature table 212, then the type signature may be considered to represent a valid type. Conversely, if the type signature is not located in signature table 212, then the type signature may be considered to not represent a valid type.

If the type is determined to be valid at block 908, flow continues at block 916. At block 916, one or more fields are extracted from the serialized binary blob; object references likewise extracted therefrom are tracked; and the empty graph of objects is filled in using the extracted information. For example, values 606 for value field(s) 306V (as optionally identified by prefixes 604) may be extracted from serialized binary blob 218, and object references for reference field(s) 306R may likewise be extracted. The extracted object references may be tracked to ensure that objects 502 are fully accounted for and that existing successor and predecessor linkages are properly replicated between and among objects 502. The extracted information may be used to fill in the empty graph of objects to gradually build new graph of objects 214.

At block 918, it is determined whether the end of the received serialized bit stream/binary blob has been reached. For example, it may be determined whether the last type signature tag 602 and related values 606 and/or prefixes 604 (if any) of serialized binary blob 218 have been extracted and deserialized. If not, flow continues at block 906 where the next type signature is extracted.

If, on the other hand, it is determined at block 918 that the end of the received serialized bit stream has been reached, then flow continues at block 920. At block 920, the deserialization may be considered to be completed and a new graph of objects to be produced. For example, deserialization or reconstitution of graph of objects 204 may be considered to be completed at destination entity 104 when graph of objects 204 has been replicated as new graph of objects 214.

Continuing at block 908, if it is determined that the object type as represented by the type signature does not constitute a valid type, then the deserialization procedure may be aborted. However, if the deserialization procedure of destination entity 104 employs forward version compatibility, then an additional determination may alternatively be performed in lieu of an immediate abortion of the deserialization procedure.

Specifically, it may be determined at block 910 whether the "invalid" object type as represented by the type signature has been extracted from an optional field. Such an optional field and implementation of forward version compatibility is described further below in relation to an exemplary hashing implementation. If the field is determined to be optional at block 910, then at block 914 the field is skipped, and the type signature extracted therefrom is ignored. After block 914, the flow of the deserialization procedure continues at block 918. If, however, the field is determined to not be optional at block 910, then flow continues at block 912 in which the deserialization procedure is aborted.

The paradigm of FIG. 2 and the approaches of FIGS. 7-9, for example, are illustrated in diagrams that are divided into multiple blocks. However, the order and/or layout in which the paradigm and approaches are described and/or shown is not intended to be construed as a limitation, and any number of the blocks can be combined, rearranged, augmented, omitted, etc. in any manner to implement one or more systems, methods, media, apparatuses, arrangements, etc. for signature-related serialization. Furthermore, although the description herein includes references to specific implementations such as those of FIGS. 3-6 (as well as the 11 exemplary system environment of FIG. 10), the paradigm and approaches can be implemented in any suitable hardware, software, firmware, or combination thereof and using any suitable programming language(s), communication mechanism(s), object type system(s), address space entities, and so forth.

Exemplary Signature Table Creation in a Hashing Implementation

In this exemplary hashing implementation, signature table creation 210 (of FIG. 2) employs a hashing algorithm to create the type signatures of signature table 212. As described below, the type signature, which is an indication of each object type, is condensed into a single 32-bit value per instance using a hashing algorithm that is responsive to the structural properties of the different object types. In these exemplary hashing implementations, object type examples are selected from a Microsoft® Windows® environment. However, the principles described herein are applicable generally.

In a described implementation, the hashing algorithm uses (i) the type name of an object type, (ii) the object type's place in the type system hierarchy, and (iii) the number and type of member fields of the object type to generate a 32-bit value that serves as the type signature to tag instances of the object type during the serialization process. As an example, a type ABC inherits from a generic or root type such as "System.Object" and has two member fields: an integer and a string. This ABC type is different from a type EDF that also inherits from System.Object and has the same two member fields. Furthermore, type ABC is also different from a later version of the ABC type that has three member fields: an integer, a string, and a date. The hashing algorithm is generally capable of distinguishing each sample object type from the other two sample object types by creating different type signatures for each sample object type.

It should be noted that the output of the hashing algorithm is not guaranteed to be automatically unique because it uses a recursive hashing algorithm. Consequently, an extra check may be performed at development time to ensure that no two object types result in the same type signature. When two object types do collide into the same type signature, a manual fix may be applied. For example, the order of member fields for one of the object types may be swapped, the type name of one of the object types may be changed, and so forth.

In a described implementation, the hashing algorithm engages in the following actions:

(0) The algorithm starts with a hash value of zero for each object type.

(1) The type name of the current object type is converted to Unicode Transformation Format (UTF), such as UTF-8, and each byte is passed through a hashing function to update the hash value.

Alternatively, another alphanumeric-to-numeral conversion scheme may be employed, such as UTF-16, UTF-32, a non-UTF scheme, and so forth. An exemplary hashing function is a cyclic redundancy code with 32 bits (CRC 32) function, but other functions may alternatively be employed.

(2) For each serializable instance field that is directly declared in the current object type, the object type of the field is used to update the hash value.

Each type has a prefix of a predetermined bit-length to which it corresponds. The predetermined bit-length of the prefix is used to update the hash value. This bit-length may be of any length, such as two bits, three bits, a byte, and so forth. Also, the bit-lengths may vary between types. For example, "System.Boolean", "System.Int16", and "System.Int32" are each assigned different prefix values.

(a) If the field is an atomic type, like integer or string, the algorithm moves to the next field.

(b) If the field is an instance of "System.Collections.ArrayList", which is a class but also a common container, the algorithm emits a special pre-selected prefix and moves to the next field.

(c) If the field is an array, the algorithm iterates action (2) for the type of the element of the array.

(d) If the field is an object type or a value type, the type name of the associated type is converted to UTF-8, and each byte is passed through the hashing function to update the hash value.

(3) The predecessor of the current object type is selected. If it is not null, the algorithm returns to action (1).

(4) The final hash value is associated with the object type as the type signature thereof.

Exemplary Serialization in a Hashing Implementation

After respective hash values for respective object types 302 have been created using the hashing algorithm described above, they are associated with the respective object types 302 as type signatures in a signature table 212. Once signature table 212 is populated with the hash values, a procedure for serialization 206 (of FIG. 2) can occur. It should be understood that many aspects described in the context of these exemplary hashing implementations may also be applied in non-hashing implementations.

In a described implementation, the serialization procedure and/or a serializer engages in the following actions:

(0) Create an empty duplicate table. The duplicate table can be used as a cross-reference mechanism to facilitate referencing objects that have already been serialized during serialization, or deserialized during deserialization. The cross-reference is implemented using an index to a given entry of the duplicate table.

(1) Push the root of the graph of objects to be serialized into a FIFO queue of objects to process.

(2) Extract an object from the FIFO queue of objects to process. If there are no objects, the serialization procedure ends.

(3) If the extracted object is "null", emit a prefix (of predetermined bit-length), such as "PELEMENT_TYPE_SERIALIZATION_NULL", and return to action (2).

(4) If the extracted object is a reference to an object already present in the duplicate table, emit a prefix, such as "PELEMENT_TYPE_SERIALIZATION_DUPLICATE", followed by an integer, where the integer is an index to the duplicate object in the duplicate table. The serialization procedure returns to action (2).

(5) Emit the type signature (e.g., the hash value) of the object type and insert this object into the duplicate table.

(6) For each serializable instance member field of this extracted object, convert the type of the field to its prefix.

(7) If the prefix is that of an atomic type, emit the binary representation of the value of the field. The prefix may be omitted because its type is implied by the value's relative position in the serialized bit stream.

(8) If the prefix is that of an arraylist, an enhancement, if not an optimization, is performed: a special prefix is emitted, the length of the arraylist is inserted into the serialized bit stream, and then each member of the arraylist is serialized by pushing the object reference into the FIFO queue and recursing starting at action (2).

(9) If the prefix is that of an array, a similar enhancement is effectuated: a special prefix is emitted, the length of the array is inserted into the serialized bit stream, and each member is serialized. However, arraylists differ from arrays as follows: the type of elements of an array can be more specific than the generic "System.Object" used for arraylists. Thus, the types of the elements of the array are analyzed. If a type is an atomic type or a value type, the serialization procedure skips actions (3), (4), and (5) because the type is implied by the relative position in the serialized bit stream.

(10) If the prefix is that of a value type, the contents are serialized, but no prefix/hash value is emitted. A value type is a final object type, so it cannot be sub-classed nor can it be null. Consequently, its type is implied by the relative position of the contents in the serialized bit stream. To serialize the contents of the value type, the serialization procedure is recursed starting from action (6).

(11) If the prefix is associated with an object type, the contents of its field is serialized by pushing the object reference into the FIFO queue and recursing the serialization procedure starting at action (2).

Exemplary Forward Version Compatibility Implementation (Serialization)

Serialization as described herein reduces the amount of data used to serialize a graph of objects, and it may include support of forward-compatible encoding for object references. As noted above with reference to FIG. 9 (e.g., blocks 908-914), an entire deserialization procedure can be aborted if an object in a graph of objects cannot be deserialized. This can occur when a device operating under a first version of a type system 208 receives a serialized object (e.g., as indicated by a type signature associated therewith) that is newly introduced in a second, later version of the type system 208. As described below, this lack of forward-compatibility can be eliminated, or at least alleviated.

In a described forward version compatibility implementation, each reference field 306R (of FIG. 3) in an object type 302 can be flagged as optional. As illustrated in FIG. 3, respective successor reference fields 306RS(1) . . . 306RS(n) correspond to respective optional flags 308(1) . . . 308(n). However, each successor reference field 306RS need not have or correspond to a respective optional flag 308(1 . . . n).

A deserializer and/or destination entity 104 may not have sufficient knowledge to deserialize a received object because its object type is not known to the receiving system or because it has changed from one version of a type system 208 to another. When there is not sufficient knowledge to deserialize the received object and the received object is from a reference field 306RS with an optional flag 308, that reference is set to "null" and the deserialization procedure continues.

Thus, certain fields 306 of an object type 302 are markable as being optional. This optional marking may be accomplished, for example, through the use of a custom attribute, such as the "Microsoft.SPOT.OptionalField" custom attribute. An example follows:

An object type is defined to describe an appointment, which is to be used in version 1 of a product:

```
Class Appointment
{
    string Title;
    string Location;
    DateTime Time;
}
```

If a new field is added for version 2, the hash value for the object type differs between version 1 and version 2. Consequently, a device using version 1 of the, e.g., software cannot decode a serialized bit stream including the hash value created using version 2 of the object type.

Instead of adding a new field, space can be set aside in version 1 and marked "for future expansion":

```
Class Appointment
{
    string Title;
    string Location;
    DateTime Time;
    [Microsoft.SPOT.OptionalField] object ExtraInfo;
}
```

In version 2, an "ExtendedAppointment" object type can be defined. Object instances of this object type may be assigned to the "ExtraInfo" field of the "ClassAppointment" object type:

```
Class ExtendedAppointment
{
    string Notes;
    bool Recurring;
}
```

When a device using version 1 of the software attempts to decode a serialized bit stream with ClassAppointment, it extracts the hash value for the ExtraInfo field and ascertains that it does not have a suitable associated object type. To handle this, the software of the device (i) leaves a null pointer in ExtraInfo and (ii) moves forward along the serialized bit stream by skipping the part of the stream that describes ExtendedAppointment.

When implementing forward version compatibility, action (11) from above is modified to account for cases in which a field is marked as optional. A modified action (11) to handle forward version compatibility may be implemented as:

(11) If a field is marked as optional, the contents thereof are serialized, but a special tag, "PELEMENT_TYPE_SERIALIZATION_OPTIONAL", is prepended to a substream for the serialized bit stream, followed by the length of the substream. If the deserialization fails to ascertain how to deserialize the substream, a deserializer has sufficient information to skip it.

Exemplary Deserialization in a Hashing Implementation

After respective hash values for respective object types 302 have been created using the hashing algorithm described above, they are associated with the respective object types 302 as type signatures in a signature table 212. Once signature table 212 is populated with the hash values and serialized binary blob 218 is received, a procedure for deserialization 216 (of FIG. 2) can occur. The implementation for a deserializer mirrors the one for the serialized In a described implementation, the deserialization procedure and/or the deserializer engages in the following actions:

(0) Create an empty duplicate table.

In accordance with the structural representation of each object type as ascertained from a signature table that is accessed using each type signature extracted from a received serialized bit stream:

(1) Extract a prefix from the received serialized bit stream.

(2) If the prefix is "PELEMENT TYPE_SERIALIZATION_NULL", then return "null".

(3) If the prefix is "PELEMENT TYPE_SERIALIZATION_DUPLICATE", extract an indexing integer "n" and return the nth element from the duplicate table.

(4) If the field is for an atomic type, extract the binary representation of the value of the field. (Extracting the prefix may be omitted because its type may be inferred by the relative position in the serialized bit stream.)

(5) If the field is for an arraylist, the length of the arraylist is extracted. An instance is created of the same size, and N recursions are performed to extract the contents.

(6) If the field is for an array, a similar approach is employed: the length of the array is extracted, an instance of the same size is created, and N recursions to extract the contents are performed. However, the type of the elements of an array can be more specific than the generic "System.Object" used for arraylists. Thus, the types of the elements are analyzed, and if a type is an atomic type or a value type, the procedure skips actions (1), (2), and (3) because the type is implied by the relative position in the serialized bit stream.

(7) If the field is an object or a value type, its contents are deserialized by recursing the procedure for each member field, restarting from action (1). If the type of member field is an atomic type or a value type, restart from action (4) because its type is implied by the relative position in the serialized bit stream.

Exemplary Forward Version Compatibility Implementation (Deserialization)

When implementing forward version compatibility for deserialization to avoid aborting the entire deserialization procedure, action (7) from above, is modified to account for cases in which a hash value is unidentifiable and its field is marked as optional. A modified action (7) to handle forward version compatibility may be implemented as:

(7) If a field is optional and its object type cannot be decoded, the whole substream corresponding thereto is skipped using a substream length identifier.

Exemplary Deserialization Clarification Implementation

As described above with reference to actions (11) and (7) (under the Exemplary Forward Version Compatibility Implementation sections) and with reference to the actions of blocks 908-914 (of FIG. 9), a field and/or a serialized bit substream may be skipped if the deserializer does not have sufficient knowledge to properly decode/interpret it. However, this skipping is described in the context of fields that are marked as optional, which typically entails some measure of pre-planning for future versions.

The exemplary deserialization clarification implementation described in this section avoids at least some of such pre-planning on a field-by-field and/or object-by-object basis. Instead, a serialization 206 (of FIG. 2) and a deserialization 216 have increased communication functionality. Specifically, deserialization 216 is adapted to ask serialization 206 for a clarification when deserialization 216 receives a type signature that it cannot decode in a serialized binary blob 218. Without such decoding, deserialization 216 is unable to properly interpret information (such as a subsequent value or a substream) that corresponds to the type signature.

In operation, deserialization 216 (e.g., a deserializer) and serialization 206 (e.g., a serializer) are capable of performing a communication exchange. It should be noted that another component of destination entity 104 and/or originating entity 102, respectively, may alternatively perform this communication exchange.

Deserialization 216 extracts type signatures from serialized binary blob 218 as otherwise described herein. Further, deserialization 216 accesses signature table 212 to ascertain the associated object type 302 for each received type signature. When a received type signature is not located in signature table 212, deserialization 216 communicates with serialization 206.

Specifically, deserialization 216 sends the unknown type signature to serialization 206 with or in an inquiry regarding the object type 302 that is associated therewith. Serialization 206 accesses its signature table 212 using the type signature received from deserialization 216 and ascertains the associated object type 302. Serialization 206 then sends the associated object type 302 to deserialization 216 (e.g., with a reference to the inquiry and/or the associated, previously unknown, type signature).

Deserialization 216 receives the associated object type 302 and uses the structural representation thereof to interpret the information corresponding to the previously unknown type signature from serialized binary blob 218. Deserialization 216 can then complete deserialization of serialized binary blob 218. Optionally, deserialization 216 can also store the previously unknown type signature in association with the received object type 302 in its signature table 212. In this manner, deserialization 216 requests and receives a clarification/explanation of a type signature that it cannot decode, and it is optionally prepared to handle this type signature afterwards without a request.

Exemplary Serialization/Deserialization Hints Implementation

Attributes can be used to annotate types or fields thereof. Flagging a field as optional, as described above, may be implemented as an attribute. In this section, serialization/deserialization hints (or simply serialization hints) as attributes that encode information of an instance of an object during serialization are described.

Thus, each serialization hint declares how information is serialized, or is to be serialized. These serialization hints enable information to be encoded with fewer bits in the serialized bit stream. Examples of serialization hints include:

(1) A bit packed serialization hint can declare that a given field uses a portion of the maximum possible number of bits assigned to the field type. For instance, instead of transmitting a full 32 bits for each integer of data when the field is directed to temperature (e.g., −100 to +100 degrees Celsius), 8 bits may be transmitted to cover the 201 different temperature units.

(2) A range bias serialization hint can declare that a range of interest is shifted. For instance, if a range of 130 to 159 is desired (which occupies 8 bits), a range bias can indicate that a bit value of "0" equates to "130" to focus on the pertinent spread of 30 units (which occupies 5 bits).

(3) A scale serialization hint can reduce the number of bits used to transmit a field by declaring that a maximum resolution is not used. For instance, a time field that is directed to an appointment program may ignore seconds and only include a resolution of every quarter hour (e.g., every 15 minutes). Thus, instead of accounting for 86,400 units of time a day (60 sec/min×60 min/hour×24 hours/day), 96 units of time (4¼-hour periods/hour×24 hours/day) may be used instead.

(4) An array size serialization hint declares a preset number of elements for a given array. The size of the array can then be omitted from the serialized bit stream.

(5) A fixed type serialization hint declares that a particular reference field is always of a single type. For instance, a fixed type serialization hint may specify that the predecessor reference field is always of type "Node" (e.g., it cannot be of type "Subnode"). Consequently, a type signature may be omitted when serializing predecessor reference fields.

(6) A pointer never null serialization hint declares that a reference field is not null., For instance, this pointer never null attribute may be used if a developer is certain that in a given application a particular reference field always points to an object. Consequently, the serialization engine can omit indicating that a reference field is not null. (However, using duplicates with a pointer never null serialization hint can cause problematic inconsistencies.)

It should be noted that the serialization hints can be used together. For example, if a predecessor field is marked as fixed type and pointer never null, a serialization engine can immediately begin describing the predecessor object without adding a prefix to the serialized bit stream. A deserialization engine can infer how received information is to be interpreted based on the relative position of the information in the serialized bit stream.

Exemplary Operating Environment for Computer or Other Electronic Device

Figure 10:
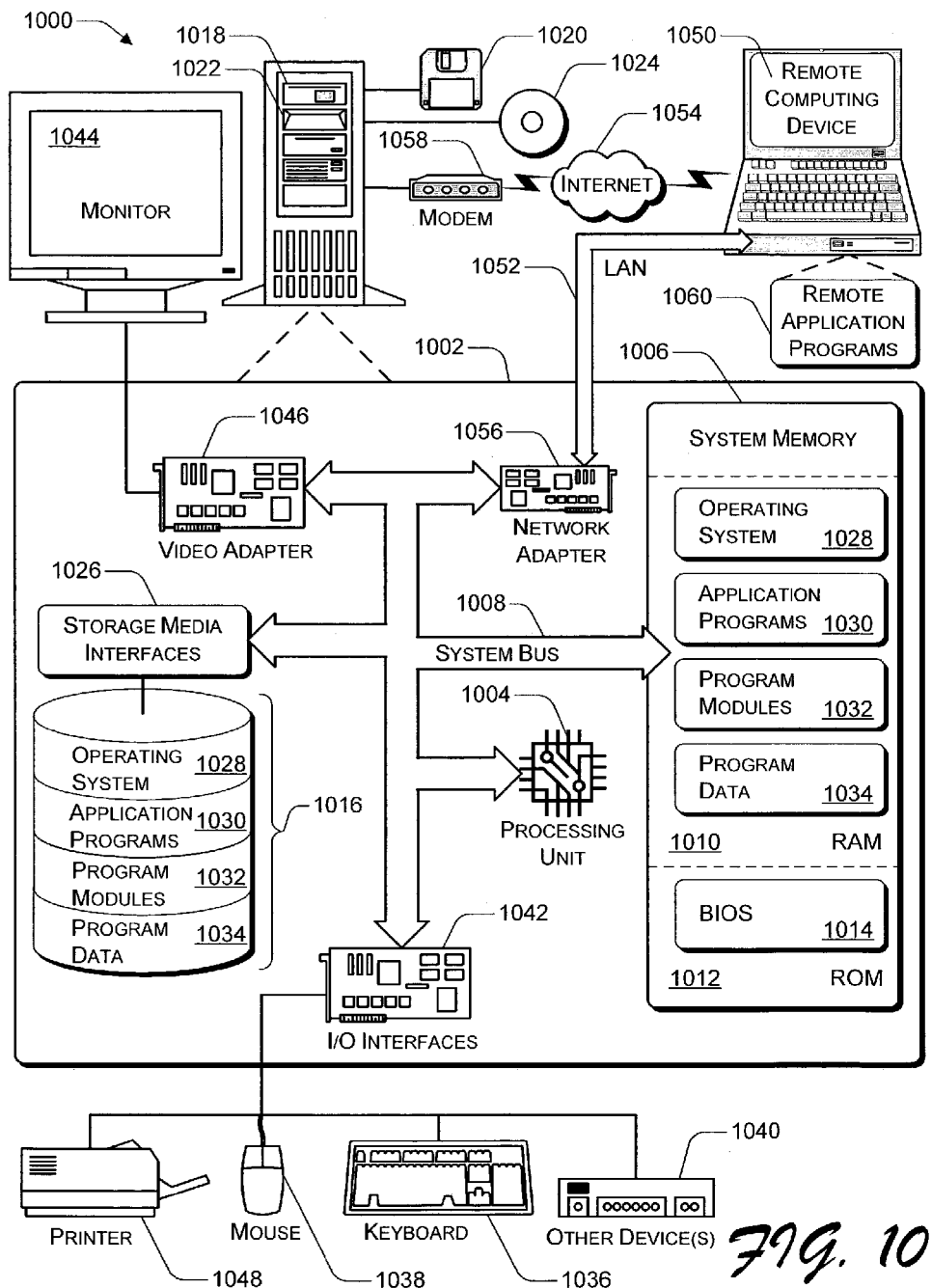
FIG. 10 illustrates an exemplary computing (or general electronic device) operating environment that is capable of (wholly or partially) implementing at least one aspect of signature serialization as described herein.

FIG. 10 illustrates an exemplary computing (or general electronic device) operating environment 1000 that is capable of (fully or partially) implementing at least one system, device, component, arrangement, protocol, approach, method, process, some combination thereof, etc. for signature-related serialization as described herein. Computing environment 1000 may be utilized in the computer and network architectures described below or in a stand-alone situation.

Exemplary electronic device operating environment 1000 is only one example of an environment and is not intended to suggest any limitation as to the scope of use or functionality of the applicable electronic (including computer, game console, television, etc.) architectures. Neither should electronic device environment 1000 be interpreted as having any dependency or requirement relating to any one or to any combination of components as illustrated in FIG. 10.

Additionally, signature-related serialization may be implemented with numerous other general purpose or special purpose electronic device (including computing system) environments or configurations. Examples of well known electronic (device) systems, environments, and/or configurations that may be suitable for use include, but are not limited to, personal computers, server computers, thin clients, thick clients, personal digital assistants (PDAs) or mobile telephones, watches, hand-held or laptop devices, multiprocessor systems, microprocessor-based systems, set-top boxes, programmable consumer electronics, video game machines, game consoles, portable or handheld gaming units, network PCs, minicomputers, mainframe computers, distributed computing environments that include any of the above systems or devices, some combination thereof, and so forth.

Implementations for signature-related serialization may be described in the general context of electronically-executable instructions. Generally, electronically-executable instructions include routines, programs, objects, components, data structures, etc. that perform particular tasks or implement particular abstract data types. Signature-related serialization, as described in certain implementations herein, may also be practiced in distributed computing environments where tasks are performed by remotely-linked processing devices that are connected through a communications link and/or network. Especially in a distributed computing environment, electronically-executable instructions may be located in separate storage media, executed by different processors, and/or propagated over transmission media.

Electronic device environment 1000 includes a general-purpose computing device in the form of a computer 1002, which may comprise any electronic device with computing and/or processing capabilities. The components of computer 1002 may include, but are not limited to, one or more processors or processing units 1004, a system memory 1006, and a system bus 1008 that couples various system components including processor 1004 to system memory 1006.

System bus 1008 represents one or more of any of several types of wired or wireless bus structures, including a memory bus or memory controller, a peripheral bus, an accelerated graphics port, and a processor or local bus using any of a variety of bus architectures. By way of example, such architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, some combination thereof, and so forth.

Computer 1002 typically includes a variety of electronically-accessible media. Such media may be any available media that is accessible by computer 1002 or another electronic device, and it includes both volatile and non-volatile media, removable and non-removable media, and storage and transmission media.

System memory 1006 includes electronically-accessible storage media in the form of volatile memory, such as random access memory (RAM) 1010, and/or non-volatile memory, such as read only memory (ROM) 1012. A basic input/output system (BIOS) 1014, containing the basic routines that help to transfer information between elements within computer 1002, such as during start-up, is typically stored in ROM 1012. RAM 1010 typically contains data and/or program modules/instructions that are immediately accessible to and/or being presently operated on by processing unit 1004.

Computer 1002 may also include other removable/non-removable and/or volatile/non-volatile storage media. By way of example, FIG. 10 illustrates a hard disk drive or disk drive array 1016 for reading from and writing to a (typically) non-removable, non-volatile magnetic media (not separately shown); a magnetic disk drive 1018 for reading from and writing to a (typically) removable, non-volatile magnetic disk 1020 (e.g., a "floppy disk"); and an optical disk drive 1022 for reading from and/or writing to a (typically) removable, non-volatile optical disk 1024 such as a CD-ROM, DVD, or other optical media. Hard disk drive 1016, magnetic disk drive 1018, and optical disk drive 1022 are each connected to system bus 1008 by one or more storage media interfaces 1026. Alternatively, hard disk drive 1016, magnetic disk drive 1018, and optical disk drive 1022 may be connected to system bus 1008 by one or more other separate or combined interfaces (not shown).

The disk drives and their associated electronically-accessible media provide non-volatile storage of electronically-executable instructions, such as data structures, program modules, and other data for computer 1002. Although exemplary computer 1002 illustrates a hard disk 1016, a removable magnetic disk 1020, and a removable optical disk 1024, it is to be appreciated that other types of electronically-accessible media may store instructions that are accessible by an electronic device, such as magnetic cassettes or other magnetic storage devices, flash memory, CD-ROM, digital versatile disks (DVD) or other optical storage, RAM, ROM, electrically-erasable programmable read-only memories (EEPROM), and so forth. Such media may also include so-called special purpose or hard-wired integrated circuit (IC) chips. In other words, any electronically-accessible media may be utilized to realize the storage media of the exemplary electronic system and environment 1000.

Any number of program modules (or other units or sets of instructions) may be stored on hard disk 1016, magnetic disk 1020, optical disk 1024, ROM 1012, and/or RAM 1010, including by way of general example, an operating system 1028, one or more application programs 1030, other program modules 1032, and program data 1034. By way of specific example but not limitation, serialization 206 for an originating entity 102 and deserialization 216 for a destination entity 104 (all of FIG. 2) may be part of operating system 1028, application programs 1030, and/or program modules 1032, depending on the configuration of a given electronic device. Graph of objects 204, new graph of objects 214, and serialized binary blob 218 that is currently in system memory may be part of program modules 1032 and/or program data 1034.

A user may enter commands and/or information into computer 1002 via input devices such as a keyboard 1036 and a pointing device 1038 (e.g., a "mouse"). Other input devices 1040 (not shown specifically) may include a microphone, joystick, game pad, satellite dish, serial port, scanner, and/or the like. These and other input devices are connected to processing unit 1004 via input/output interfaces 1042 that are coupled to system bus 1008. However, they and/or output devices may instead be connected by other interface and bus structures, such as a parallel port, a game port, a universal serial bus (USB) port, an infrared port, an IEEE 1394 ("Firewire") interface, an IEEE 802.11 wireless interface, a Bluetooth®) wireless interface, and so forth.

A monitor/view screen 1044 or other type of display device may also be connected to system bus 1008 via an interface, such as a video adapter 1046. Video adapter 1046 (or another component) may be or may include a graphics card for processing graphics-intensive calculations and for handling demanding display requirements. Typically, a graphics card includes a graphics processing unit (GPU), video RAM (VRAM), etc. to facilitate the expeditious performance of graphics operations. In addition to monitor 1044, other output peripheral devices may include components such as speakers (not shown) and a printer 1048, which may be connected to computer 1002 via input/output interfaces 1042.

Computer 1002 may operate in a networked environment using logical connections to one or more remote computers, such as a remote computing device 1050. By way of example, remote computing device 1050 may be a personal computer, a portable computer (e.g., laptop computer, tablet computer, PDA, mobile station, etc.), a palm or pocket-sized computer, a watch, a gaming device, a server, a router, a network computer, a peer device, other common network node, or another computer type as listed above, and so forth. However, remote computing device 1050 is illustrated as a portable computer that may include many or all of the elements and features described herein with respect to computer 1002.

Logical connections between computer 1002 and remote computer 1050 are depicted as a local area network (LAN) 1052 and a general wide area network (WAN) 1054. Such networking environments are commonplace in offices, enterprise-wide computer networks, intranets, the Internet, fixed and mobile telephone networks, ad-hoc and infrastructure wireless networks, other wireless networks, gaming networks, some combination thereof, and so forth.

When implemented in a LAN networking environment, computer 1002 is usually connected to LAN 1052 via a network interface or adapter 1056. When implemented in a WAN networking environment, computer 1002 typically includes a modem 1058 or other means for establishing communications over WAN 1054. Modem 1058, which may be internal or external to computer 1002, may be connected to system bus 1008 via input/output interfaces 1042 or any other appropriate mechanism(s). It is to be appreciated that the illustrated network connections are exemplary and that other means of establishing communication link(s) between computers 1002 and 1050 may be employed.

In a networked environment, such as that illustrated with electronic device environment 1000, program modules or other instructions that are depicted relative to computer 1002, or portions thereof, may be fully or partially stored in a remote memory storage device. By way of example, remote application programs 1060 reside on a memory component of remote computer 1050 but may be usable or otherwise accessible via computer 1002. Also, for purposes of illustration, application programs 1030 and other electronically-executable instructions such as operating system 1028 are illustrated herein as discrete blocks, but it is recognized that such programs, components, and other instructions reside at various times in different storage components of computing device 1002 (and/or remote computing device 1050) and are executed by data processor(s) 1004 of computer 1002 (and/or those of remote computing device 1050).

Although systems, media, methods, procedures, protocols, schemas, approaches, processes, arrangements, and other implementations have been described in language specific to structural, logical, algorithmic, and functional features and/or diagrams, it is to be understood that the invention defined in the appended claims is not necessarily limited to the specific features or diagrams described. Rather, the specific features and diagrams are disclosed as exemplary forms of implementing the claimed invention.

The invention claimed is:

1. One or more electronically-accessible storage media comprising electronically-executable instructions that, when executed, direct an electronic apparatus to perform actions comprising:

creating a type signature (i) using a hashing algorithm and based on an object type, the hashing algorithm comprising determining whether a field type of the object type is an atomic type and inserting information from the field into a binary blob to serialize the object without inserting a prefix corresponding to the field type, and (ii) using a type name of the object type and a prefix corresponding to a value field of the object type;

responsive to the determining of the hashing algorithm, inserting the type signature and an index into the binary blob to serialize an object, the type signature comprising the type signature based on the object type of the object, the index indicating a location of the object in a duplicate table; and transmitting the serialized binary blob.

2. The one or more electronically-accessible storage media comprising the electronically-executable instructions that, when executed, direct an electronic apparatus to perform the actions as recited in claim 1, wherein the action of creating comprises the action of:

applying a hashing function that comprises a cyclic redundancy code with 32 bits (CRC 32).

3. The one or more electronically-accessible storage media comprising the electronically-executable instructions that, when executed, direct an electronic apparatus to perform the actions as recited in claim 1, wherein the action of creating comprises the action of:

converting the type name of the object type to numerals using Unicode Transformation Format-8 (UTF-8).

4. The one or more electronically-accessible storage media as recited in claim 1, wherein the electronically-executable instructions, when executed, direct an electronic apparatus to perform a further action comprising:

creating the type signature using a type name of a predecessor object type of the object type.

5. The one or more electronically-accessible storage media as recited in claim 1, wherein the electronically-executable instructions, when executed, direct an electronic apparatus to perform further actions comprising:
   inserting a prefix for a field into the serialized binary blob to serialize the object, the prefix corresponding to a particular element type of the field; and
   inserting, after the prefix, information from the field.

6. The one or more electronically-accessible storage media as recited in claim 1, wherein the electronically-executable instructions, when executed, direct an electronic apparatus to perform further actions comprising:
   receiving a clarification request that comprises another type signature;
   accessing a signature table using the another type signature;
   ascertaining, responsive to the accessing, a structural representation of another object type that is associated with the another type signature; and
   transmitting, responsive to the receiving, the structural representation of the another object type.

7. An apparatus comprising:
   one or more storage media, the one or more storage media including electronically-executable instructions; and
   one or more processors, the one or more processors capable of executing the electronically-executable instructions to perform actions comprising:
   creating a type signature (i) using a hashing algorithm and based on an object type, the hashing algorithm comprising determining whether a field type of the object type is an atomic type and inserting information from the field into a binary blob to serialize the object without inserting a prefix corresponding to the field type, and (ii) using a type name of the object type and a prefix corresponding to a value field of the object type;
   serializing an object by inserting the type signature and an index into a the binary blob, the object corresponding to the object type, the index indicating a location of the object in a duplicate table; and
   transmitting the serialized binary blob.

8. The apparatus as recited in claim 7 wherein the type signature is further created responsive to a structural representation of the object type of the object.

9. The apparatus as recited in claim 7 wherein the action of transmitting comprises the action of:
   transmitting the serialized binary blob over a communications channel from an originating entity.

10. The apparatus as recited in claim 7 wherein the action of serializing comprises the action of:
    serializing a plurality of objects of a graph of objects by inserting a respective type signature into the serialized binary blob for each respective object of the plurality of objects, each respective type signature created responsive to each respective object type of each respective object of the plurality of objects.

11. The apparatus as recited in claim 7 wherein the one or more processors are capable of executing the electronically-executable instructions to perform further actions comprising:
    accessing a signature table using the object type of the object; and
    ascertaining the type signature, which is associated with the object type, from the accessing.

12. The apparatus as recited in claim 7 wherein the one or more processors are capable of executing the electronically-executable instructions to perform a further action comprising:
    providing an explanation of another object type in response to receiving a clarification inquiry that comprises another type signature, the another type signature associated with the another object type.

13. An apparatus having a processor comprising:
    a signature table having a plurality of entries, each respective entry of the plurality of entries associating a respective object type with a respective type signature, each respective type signature created (i) using a hashing algorithm and responsive to the associated respective object type, the hashing algorithm comprising determining whether a field type of the object type is an atomic type and inserting information from the field into a binary blob to serialize the object without inserting a prefix corresponding to the field type, and (ii) based on a type name of the respective object type and a prefix corresponding to a value field of the respective object type; and
    a serializer that serializes a graph of objects using at least one of the plurality of entries in the signature table and an index, the serializer inserting the index into the binary blob, the index indicating a location of the object in a duplicate table.

14. The apparatus as recited in claim 13 wherein the graph of objects includes multidimensional linkages between and/or among objects of the graph of objects; and wherein the serializer is adapted to transform the graph of objects into a serialized bit stream.

15. The apparatus as recited in claim 13 wherein the serializer is adapted to access the signature table using a particular object type of a particular object being serialized and to thereby ascertain a particular type signature that is associated with the particular object type.

16. The apparatus as recited in claim 15 wherein the serializer is further adapted to insert the particular type signature into a serialized bit stream.

17. The apparatus as recited in claim 13 wherein the serializer is adapted to recursively serialize objects of the graph of objects when the objects are referenced by other objects of the graph of objects.

18. The apparatus as recited in claim 13 wherein the serializer is adapted to omit prefixes for objects of object types that are implied by their relative position in a serialized bit stream produced by the serializer.

19. A system comprising a processor for serializing a graph of objects, the system comprising:
    creation means for creating a signature table from a type system, the signature table having a plurality of entries, each respective entry of the plurality of entries associating a respective object type of the type system with a respective type signature, each respective type signature created (i) using a hashing algorithm and responsive to the associated respective object type, the hashing algorithm comprising determining whether a field type of the object type is an atomic type and inserting information from the field into a binary blob to serialize the object without inserting a prefix corresponding to the field type, and (ii) based on a type name of the respective object type and a prefix corresponding to a value field of the respective object type; and
    serialization means for serializing the graph of objects using the entries found in the signature table and an index to produce a serialized binary blob table, the serialization means inserting the index into the serialized binary blob, the index indicating a location of the object in a signature duplicate table.

20. The arrangement system as recited in claim 19 wherein the signature table comprises data structure means for providing a respective type signature that is associated with each respective object type of each object of the graph of objects.

21. One or more electronically-accessible storage media comprising electronically-executable instructions that, when executed, direct an electronic apparatus to perform actions comprising:
   creating a type signature (i) using a hashing algorithm and based on an object type, the hashing algorithm comprising determining whether a field type of the object type is an atomic type and inserting information from the field into a binary blob to serialize an object without inserting a prefix corresponding to the field type, and (ii) responsive to a type name of the object type and a prefix corresponding to a value field of the object type;
   creating an index, the index indicating a location of the object in a duplicate table;
   serializing the binary blob with the type signature and the index;
   sending the serialized binary blob;
   receiving the serialized binary blob; and
   extracting: a type signature, an index from the serialized binary blob to deserialize an object in the serialized binary blob, the type signature comprising the type signature based on the object type of the object, and information for a deserialized field from the serialized binary blob to deserialize the object without extracting a prefix corresponding to the object type.

22. The one or more electronically-accessible storage media comprising the electronically-executable instructions that, when executed, direct an electronic apparatus to perform the actions as recited in claim 21 wherein the action of creating comprises applying a hashing function that comprises a cyclic redundancy code with 32 bits (CRC 32).

23. The one or more electronically-accessible storage media comprising the electronically-executable instructions that, when executed, direct an electronic apparatus to perform the actions as recited in claim 21 wherein the action of creating comprises converting the type name of the object type to numerals using Unicode Transformation Format-8 (UTF-8).

24. The one or more electronically-accessible storage media as recited in claim 21 wherein the electronically-executable instructions, when executed, direct an electronic apparatus to perform a further action comprising:
   creating the type signature responsive to a type name of a predecessor object type of the object type.

25. The one or more electronically-accessible storage media as recited in claim 21 wherein the electronically-executable instructions, when executed, direct an electronic apparatus to perform further actions comprising:
   extracting a prefix for a field from the serialized binary blob to deserialize the object, the prefix corresponding to a particular element type of the field; and
   extracting, after the prefix, information for the field.

26. The one or more electronically-accessible storage media as recited in claim 21 wherein the electronically-executable instructions, when executed, direct an electronic apparatus to perform further actions comprising:
   accessing a signature table with reference to a received type signature;
   determining, responsive to the accessing, that the received type signature is not associated with any object type in the signature table;
   transmitting a clarification request that includes the received type signature; and
   receiving, after the transmitting, the structural representation of a particular object type, the received type signature created based on the particular object type.

27. An apparatus comprising:
   one or more storage media, the one or more storage media including electronically-executable instructions; and
   one or more processors, the one or more processors capable of executing the electronically-executable instructions to perform actions comprising:
   creating a type signature (i) using a hashing algorithm and based on an object type, the hashing algorithm comprising determining whether a field type of the object type is an atomic type and inserting information from the field into a binary blob to serialize the object without inserting a prefix corresponding to the field type, and (ii) responsive to a type name of the object type and a prefix corresponding to a value field of the object type;
   creating an index, the index indicating a location of the object in a signature table;
   serializing the binary blob with the type signature and the index;
   sending the serialized binary blob;
   receiving a serialized binary blob; and
   deserializing an object by extracting the type signature and index from the serialized binary blob, the object corresponding to the object type.

28. The apparatus as recited in claim 27 wherein the type signature is further derivable from a structural representation of the object type of the object.

29. The apparatus as recited in claim 27 wherein the action of receiving comprises receiving the serialized binary blob via a communications channel at a destination entity.

30. The apparatus as recited in claim 27 wherein the action of deserializing comprises the action of:
   deserializing a plurality of objects to produce a new graph of objects by extracting a respective type signature from the serialized binary blob for each respective object of the plurality of objects, each respective type signature derivable from each respective object type of each respective object of the plurality of objects.

31. The apparatus as recited in claim 27 wherein the one or more processors are capable of executing the electronically-executable instructions to perform a further action comprising:
   deserializing another object by extracting an index from the serialized binary blob, the index indicating a location of the object in a duplicate table, the another object referencing the object.

32. The apparatus as recited in claim 27 wherein the one or more processors are capable of executing the electronically-executable instructions to perform further actions comprising:
   accessing a signature table using the type signature; and
   ascertaining the object type, which is associated with the type signature, from the accessing.

33. The apparatus as recited in claim 27 wherein the one or more processors are capable of executing the electronically-executable instructions to perform a further action comprising:
   receiving a definition of another object type responsive to a transmitted clarification inquiry that specified another type signature, the another type signature associated with the another object type.

34. An apparatus having a processor comprising:

a signature table having a plurality of entries, each respective entry of the plurality of entries associating a respective object type with a respective type signature and an index, wherein the index indicates a location of the object type in the signature table, each respective type signature created (i) using a hashing algorithm and responsive to the associated respective object type, the hashing algorithm comprising determining whether a field type of the object type is an atomic type and inserting information from the field into a binary blob to serialize the object without inserting a prefix corresponding to the field type, and (ii) based on a type name of the respective object type and a prefix corresponding to a value field of the respective object type; and a deserializer that deserializes a serialized bit stream using at least one of the plurality of entries in the signature table and the index.

35. The apparatus as recited in claim 34 wherein the deserializer is adapted to transform the serialized bit stream into a new graph of objects; and wherein the new graph of objects includes multidimensional linkages between objects of the new graph of objects.

36. The apparatus as recited in claim 34 wherein the deserializer is adapted to access the signature table using a particular type signature of a particular object being deserialized and to thereby ascertain a particular object type that is associated with the particular type signature.

37. The apparatus as recited in claim 36 wherein the deserializer is further adapted to extract the particular type signature from the serialized bit stream.

38. The apparatus as recited in claim 34 wherein the deserializer is adapted to recursively deserialize objects of the serialized bit stream when the objects reference other objects in the serialized bit stream.

39. The apparatus as recited in claim 34 wherein the deserializer is adapted to extract information of objects without extracting prefixes for the objects of object types that are implied by their relative position in the serialized bit stream.

40. A system having a processor for deserializing a serialized binary blob, the system comprising:

creation means for creating a signature table from a type system, the signature table having a plurality of entries, each respective entry of the plurality of entries associating a respective object type of the type system with a respective type signature and an index indicating a location of the object in the signature table, each respective type signature created (i) using a hashing algorithm and responsive to the associated respective object type, the hashing algorithm comprising determining whether a field type of the object type is an atomic type and extracting information for a field from the serialized blob wherein the field in the serialized blob does not have a corresponding prefix corresponding to the field type, and (ii) based on a type name of the respective object type and a prefix corresponding to a value field of the respective object type; and deserialization means for deserializing the serialized binary blob using at least one of the plurality of entries in the signature table to produce a new graph of objects.

41. The system as recited in claim 40 wherein the signature table comprises data structure means for providing a respective object type that is associated with a respective type signature extracted from the serialized binary blob by the deserialization means.

\* \* \* \* \*